United States Patent
Waldman et al.

(10) Patent No.: US 7,070,188 B2
(45) Date of Patent: Jul. 4, 2006

(54) MECHANISM FOR SELECTIVELY LOCKING SWINGABLY MOUNTED WHEEL ASSEMBLIES

(75) Inventors: Kenneth Waldman, Reading, PA (US); Jerry Drobinski, Reading, PA (US)

(73) Assignee: Simplicity, Inc., Reading, PA (US)

( * ) Notice: Subject to any disclaimer, the term of this patent is extended or adjusted under 35 U.S.C. 154(b) by 277 days.

(21) Appl. No.: 10/705,067

(22) Filed: Nov. 10, 2003

(65) Prior Publication Data

US 2005/0098969 A1  May 12, 2005

(51) Int. Cl.
- B62B 1/04 (2006.01)
- B62B 7/00 (2006.01)
- B62D 21/14 (2006.01)
- A47C 3/02 (2006.01)
- A47D 7/00 (2006.01)

(52) U.S. Cl. ............... 280/31; 280/648; 280/7.17; 280/43.24; 280/47.38; 280/87.051; 280/87.01; 280/641; 297/131; 5/93.2; 5/105

(58) Field of Classification Search ............... 280/646, 280/7.17, 9, 43, 658, 38, 47.38, 43.24, 30, 280/31, 11, 648, 7.12, 641, 87.01, 87.021, 280/87.051; 16/18 R, 19, 29, 182; 188/19, 188/20; 297/131, 130; 472/102
See application file for complete search history.

(56) References Cited

U.S. PATENT DOCUMENTS

| | | | |
|---|---|---|---|
| 1,468,682 A | 9/1923 | Wallace | |
| 1,546,617 A | 7/1925 | Caldwell et al. | |
| 2,461,609 A | 2/1949 | Light | |
| 2,541,327 A | 2/1951 | Billinghurst | |
| 2,716,439 A | 8/1955 | Feist | |
| 3,944,241 A | 3/1976 | Epelbaum | |
| 4,265,461 A | 5/1981 | Okubo | |
| 4,722,537 A | 2/1988 | Chau-Pin | |
| 5,001,808 A * | 3/1991 | Chung | 16/18 CG |
| 5,172,451 A | 12/1992 | Chiu | |
| 5,203,581 A | 4/1993 | Jankowski | |
| 5,373,708 A | 12/1994 | Dumoulin, Jr. | |
| 5,383,536 A * | 1/1995 | Butter et al. | 188/1.12 |
| 5,439,237 A * | 8/1995 | Kutchie | 280/11 |
| 5,636,853 A | 6/1997 | Huang | |
| 5,845,963 A * | 12/1998 | Huang | 297/131 |
| 5,938,218 A | 8/1999 | Chuang | |
| 6,123,300 A * | 9/2000 | Chen | 248/188.8 |
| 6,513,869 B1 | 2/2003 | Wu | |
| 6,679,779 B1 * | 1/2004 | Tai et al. | 472/95 |
| 6,704,949 B1 * | 3/2004 | Waldman et al. | 5/93.1 |
| 6,728,980 B1 * | 5/2004 | Chen | 5/93.1 |
| 2003/0137130 A1 | 7/2003 | Chang | |

* cited by examiner

Primary Examiner—C P Ellis
Assistant Examiner—G B Klebe
(74) Attorney, Agent, or Firm—Volpe and Koenig, P.C.

(57) ABSTRACT

A support frame having a plurality of wheeled assemblies, mounted at corners of the support frame, each wheeled assembly including a substantially identical mechanism for extending and retracting a respective wheel assembly. Each mechanism has a locking member which includes a locking portion for selectively engaging locking apertures on a rotatable member which rotatably supports the wheel assembly. Each mechanism also includes a grip, spaced from the locking member, to facilitate rotation of the rotatable member and the respective wheel assembly between extended and retracted positions when the locking portion is disengaged from the locking apertures. When each wheel assembly is in an extended position, the support frame is able to roll on a suitable surface. Each wheel assembly is also capable of being retained in a retracted position housed within a recess in its associated housing.

22 Claims, 10 Drawing Sheets

MECHANISM FOR SELECTIVELY LOCKING SWINGABLY MOUNTED WHEEL ASSEMBLIES

FIELD OF INVENTION

The present invention relates to a supporting frame which is advantageous for use with an infant bed or the like and more particularly to a locking device for positively locking wheel assemblies in either of two operating positions.

BACKGROUND

Wheeled support frames are well known. For example, devices to accommodate infants, such as bassinets, cribs, cradles and the like are often mounted upon wheeled supports. In some applications, it is advantageous to provide a wheeled support designed to enable the wheel assemblies to be selectively moved between retracted and extended positions. One such structure is described in U.S. Pat. No. 5,636,853, granted Jun. 10, 1997. A factor in the ease of use of these structures is the ease in which the rollers are moved between retracted and extended positions.

The device disclosed in U.S. Pat. No. 5,636,853 provides retractable wheel supports on an infant bed support enabling it to roll on a suitable surface with the rollers extended, or rock on arcuate members when the rollers are retracted. Such a device provides both rocking and non-rocking modes for an infant bed. However, the mechanism used for releasing, retracting and extending each roller requires an awkward and difficult manual actuation which requires two (2) different manual operations to be performed substantially simultaneously. It is desirable to provide a mechanism which allows a support frame to adjust between stationary and rolling modes easily with a minimum of effort.

SUMMARY

The present invention provides a support frame having a plurality of wheeled support assemblies, each mounted near corners of the support frame, each including a substantially identical mounting for extending and retracting an associated wheel assembly. When the wheel assemblies are extended downwardly, the support frame is able to roll on the wheel assemblies on any suitable surface. When the wheel assemblies are retracted the frame rests in a stationary mode on base support members.

Each mounting includes a rotatable member mounted to rotate within its associated housing. Each wheel assembly is connected to an associated rotatable member and is swingable between an extended and retracted position. A locking mechanism is mounted on each wheeled support assembly and includes a movable locking member having an integral portion for selectively engaging one of the locking openings on the rotatable member to prevent rotation of the rotatable member and its associated wheel assembly.

Moving the locking member in a first direction withdraws its integral portion from one of the locking openings, allowing the rotatable member and the wheel assembly to rotate freely.

DETAILED DESCRIPTION OF THE PREFERRED EMBODIMENTS

Figure 1:
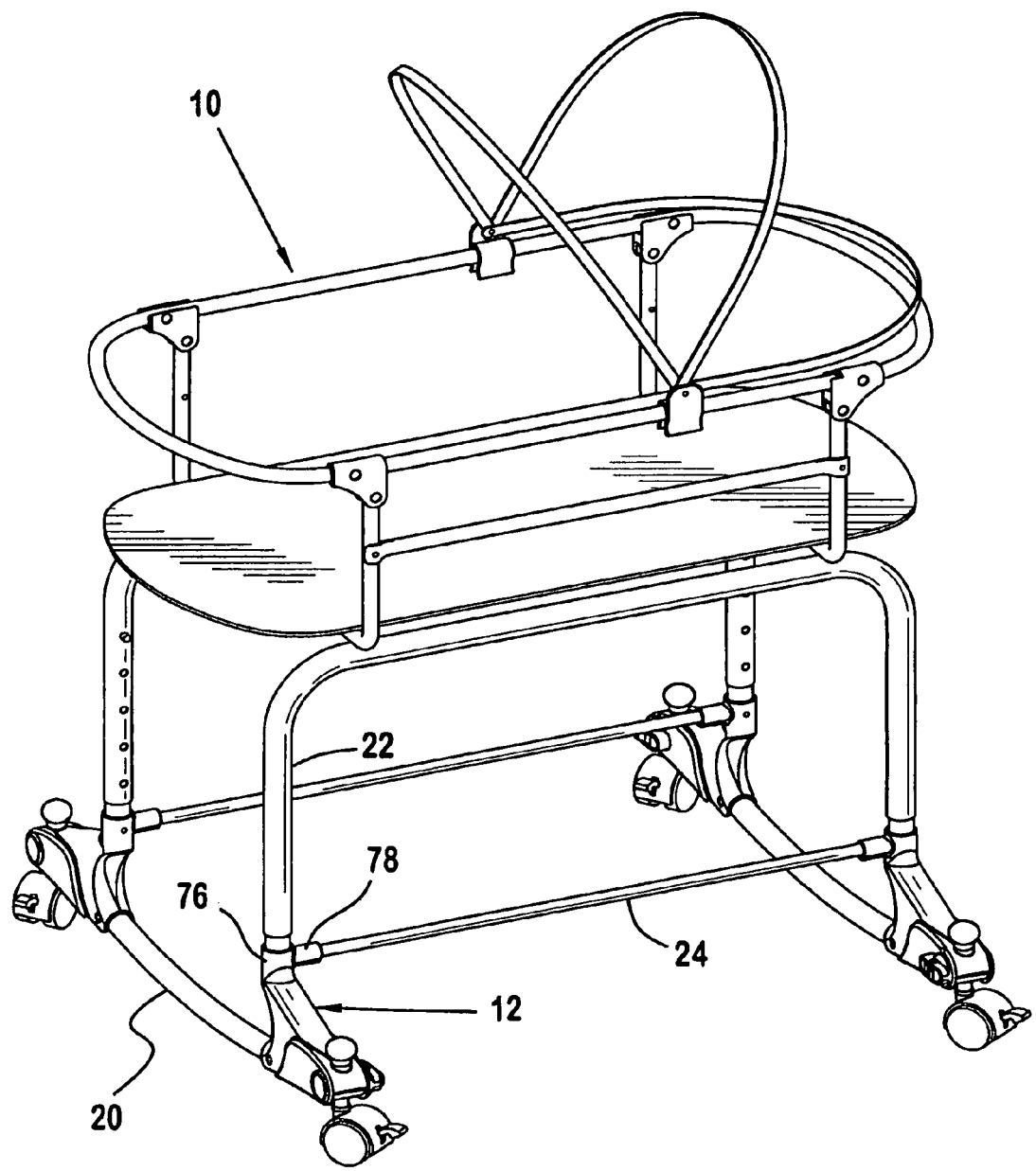
FIG. 1 is an isometric view of a support frame incorporating the present invention according to a preferred embodiment.
Figure 2:
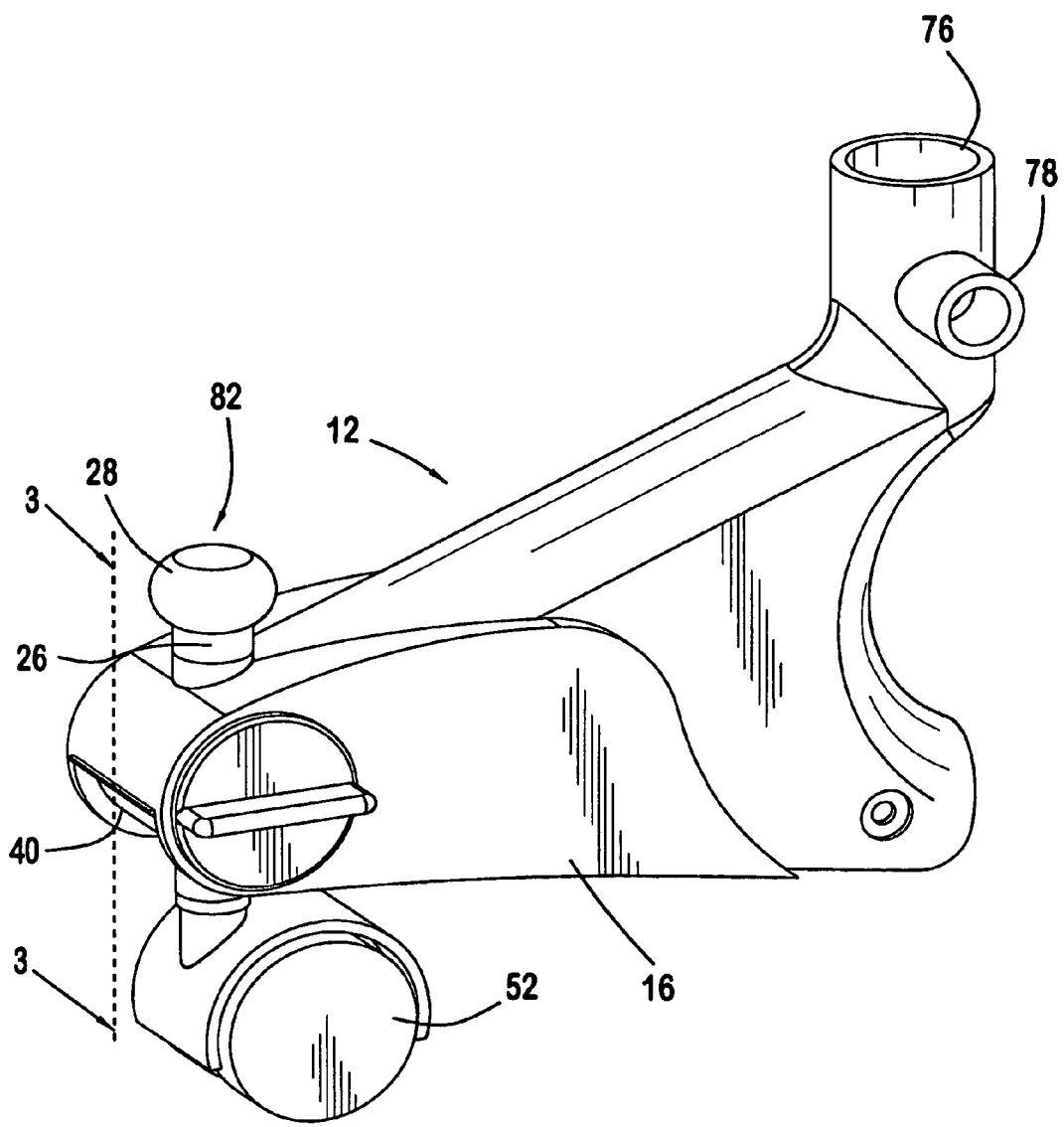
FIG. 2 is an isometric view showing one of the support assemblies of FIG. 1 in greater detail.
Figure 3:
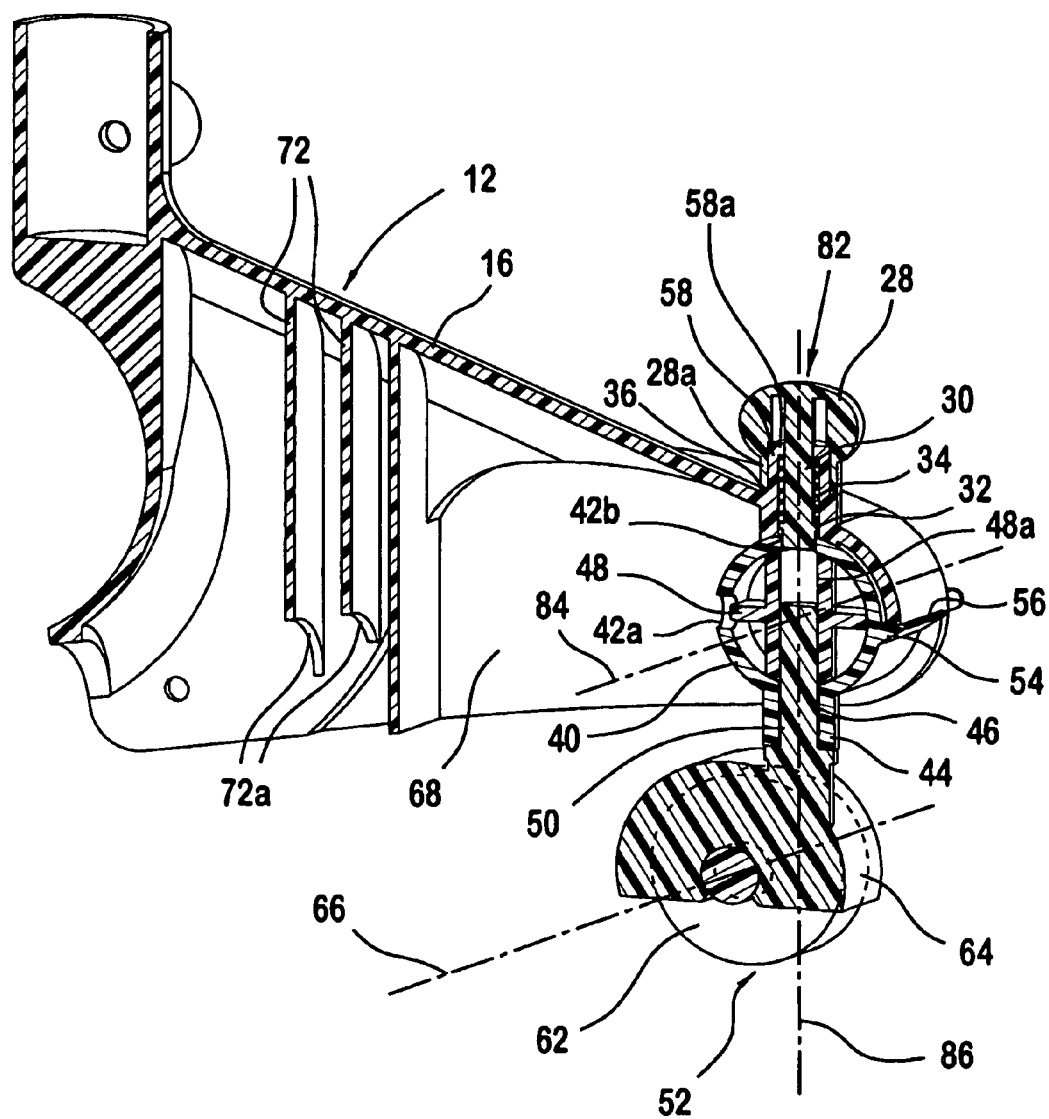
FIG. 3 is a cross-section of the support assembly looking in the direction of arrows 3—3 of FIG. 2.

FIGS. 1–3 show a support frame 10 having four wheeled support assemblies 12 according to a preferred embodiment of the present invention. Each of the wheeled support assemblies 12 includes a housing 16 preferably including molded plastic members.

Figures 2A, 2B, 2C:
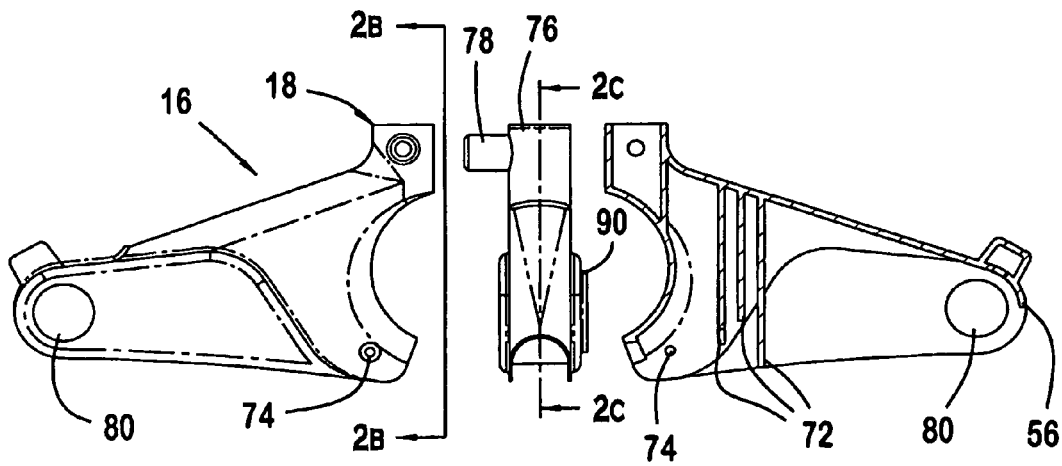
FIG. 2a is a side elevation view of a housing of the support assembly of FIG. 2.
FIG. 2b is an end view of the housing of the support assembly of FIG. 2.
FIG. 2c is a sectional view of the housing looking in the direction of arrows 2c—2c of FIG. 2b.
Figures 2D, 2E, 2F:
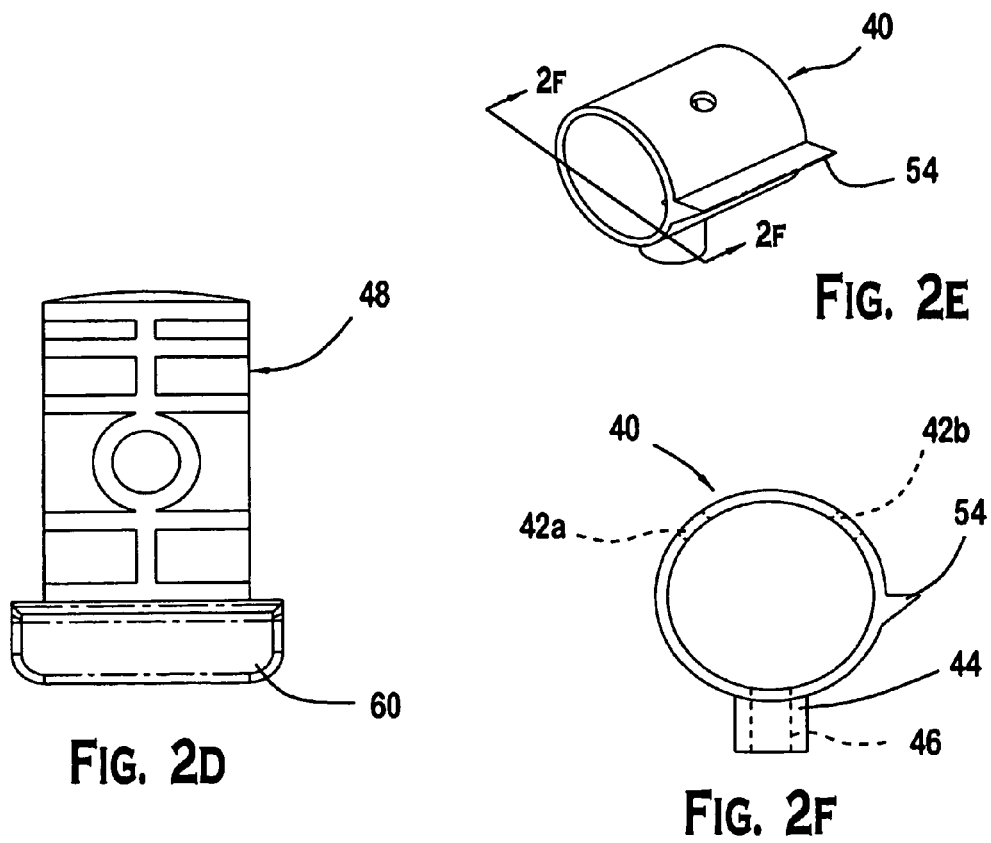
FIG. 2d is a plan view of a control member of the support assembly of FIG. 2.
FIG. 2e is an isometric view of a cylindrical member of the support assembly of FIG. 2.
FIG. 2f is a profile view of the cylindrical member of the support assembly looking in the direction of arrows 2f—2f of FIG. 2.

The ribs 72 in housing 16 cooperate with a fastener receiving aperture 74 to secure the base support member 20, see FIGS. 1 and 3. Two of the ribs 72 are curved at their lower ends 72a to conform to the shape of the member 20. An upper portion 18 of housing 16 comprises first and second hollow cylindrical projections 76, 78 which respectively receive first and second support members 22, 24 which cooperate to provide a structurally rugged support, see FIGS. 2a and 2b. The base support member 20 and first and second support members 22, 24 are preferably metallic members, however any suitable structural material may be used. The novel support assemblies of the present invention may be used with a variety of different support structures, the embodiments here being for illustrative purposes and not by way of limitation.

The support assembly 12 includes a locking mechanism 82, FIG. 2, for selectively locking its associated wheel assembly in either a retracted or an extended position. With reference to FIG. 3, locking mechanism 82 is comprised of a locking member 26 having a knob 28 and a locking projection 30. The locking projection 30 includes a flange 32 which receives one end of a spring 34. Preferably, the flange 32 is integrally formed with the locking projection 30. The spring 34 is shown as a coiled compression spring, however, other types of springs may be used. The locking projection 30 engages an inner portion of a hollow integral extension 58 of the housing 16.

The integral extension 58 includes a rim 58a which retains the spring 34 and provides a biasing force to contain the locking member 26. The knob 28 includes a cylindrical guide portion 28a which engages an outer portion of the integral extension 58 to allow alignment of the locking member 26. The member 26 is movable within a range limited by the spring 34, when fully compressed, and an integral stop 36 which engages an end of the cylindrical guide portion 28a of knob 28. To facilitate assembly, the locking member 26 may comprise multiple pieces, for example, the locking projection 30 may include a threaded end which removably engages a tapped portion of the knob 28.

The locking projection 30 selectively engages one of the locking openings 42a, 42b provided in cylindrical member 40 to prevent rotation of the cylindrical member 40. The spring 34 provides a biasing force which urges the locking member 26 in a direction to cause locking projection 30 to engage the outer surface of cylindrical member 40. When the locking projection 30 is aligned with one of the openings 42a, 42b, it enters that opening to lock the cylinder against further rotation.

Figure 3A:
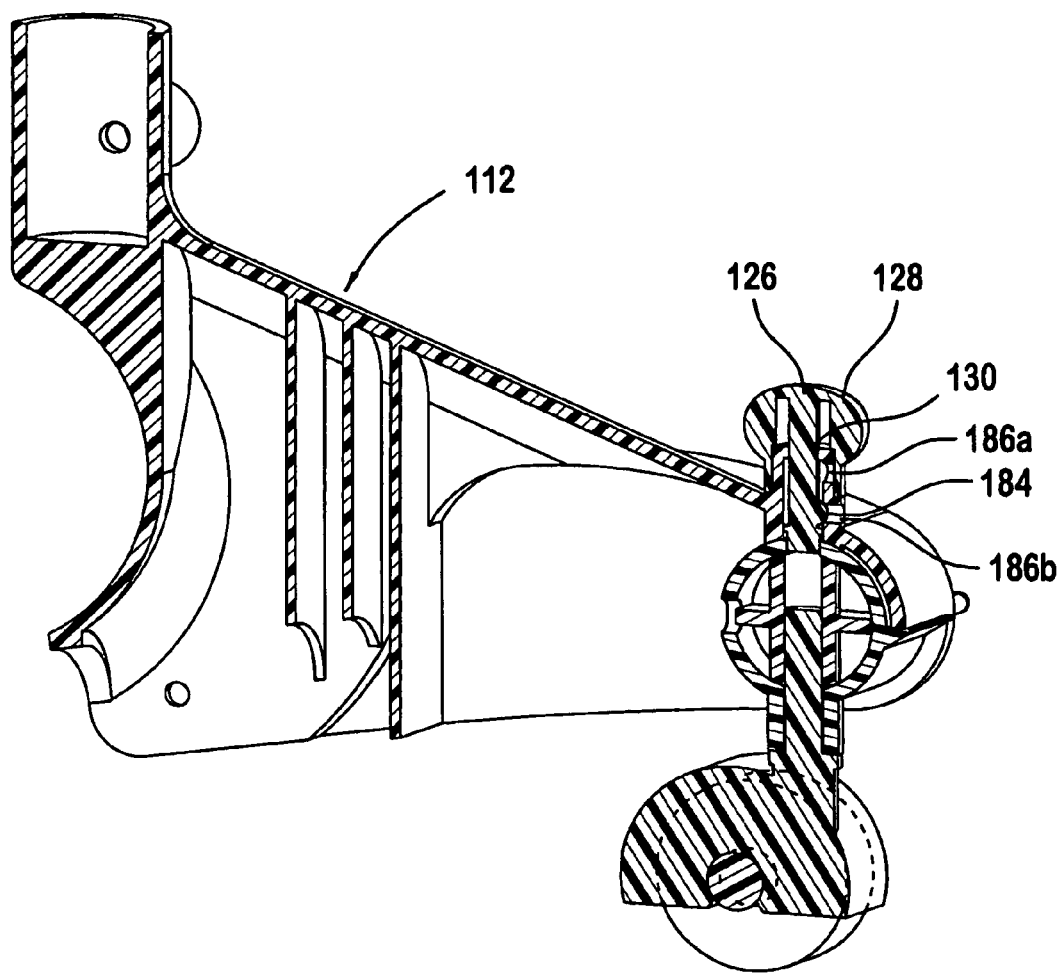
FIG. 3a is a cross-section of an alternative embodiment of the support assembly looking in the direction of arrows 3—3 of FIG. 2.

In the alternative embodiment shown in FIG. 3a, the spring 34 is omitted and the locking member 126 and locking projection 130 are locked in position by detent 184 which selectively engages one of detent apertures 186a, 186b. If desired, the detent may be provided on an inner wall of integral extension 58 and the detent openings provided as grooves on the locking projection 130.

Figure 6:
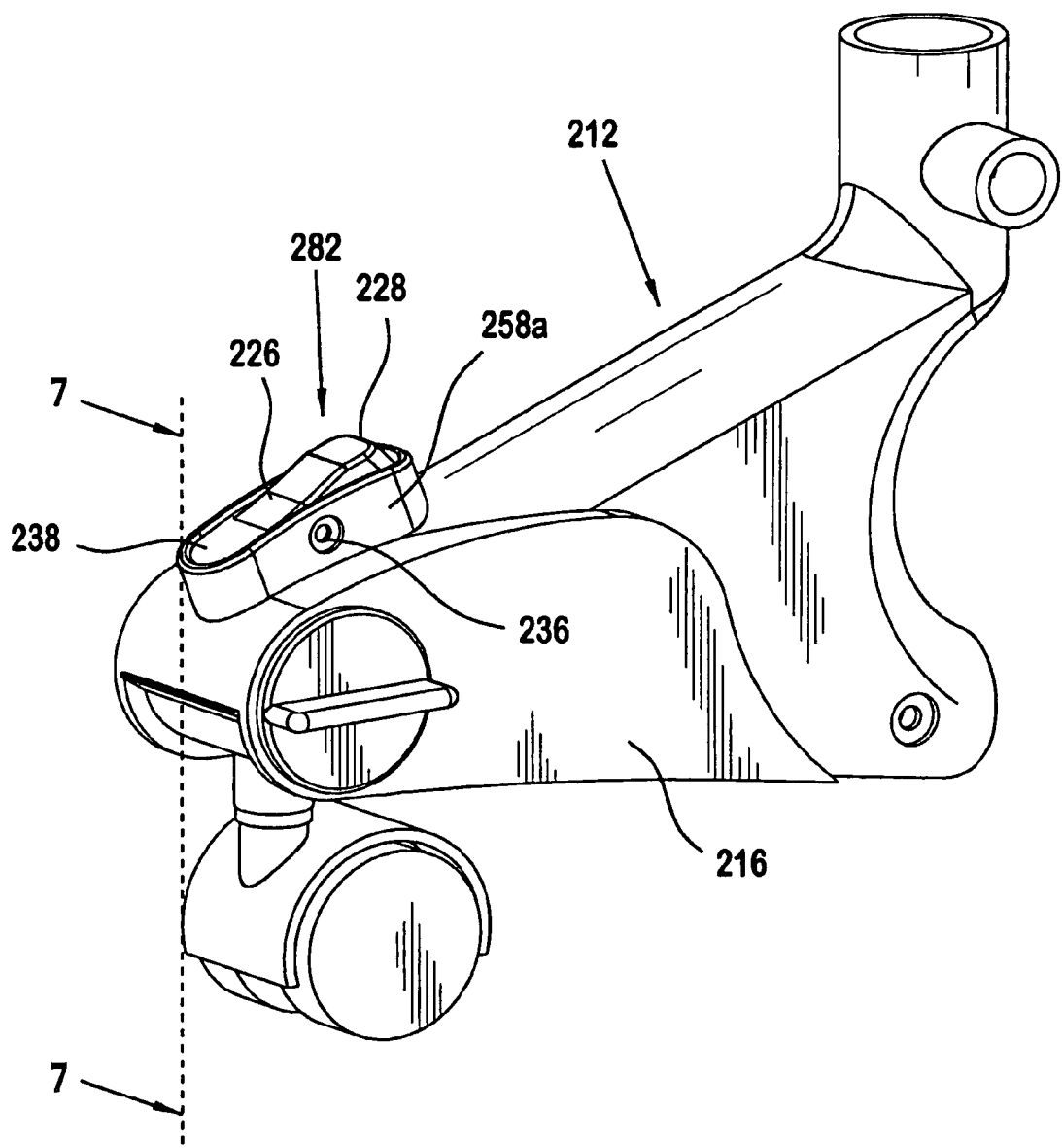
FIG. 6 is an isometric view of another alternative embodiment of the support assembly.
Figure 7:
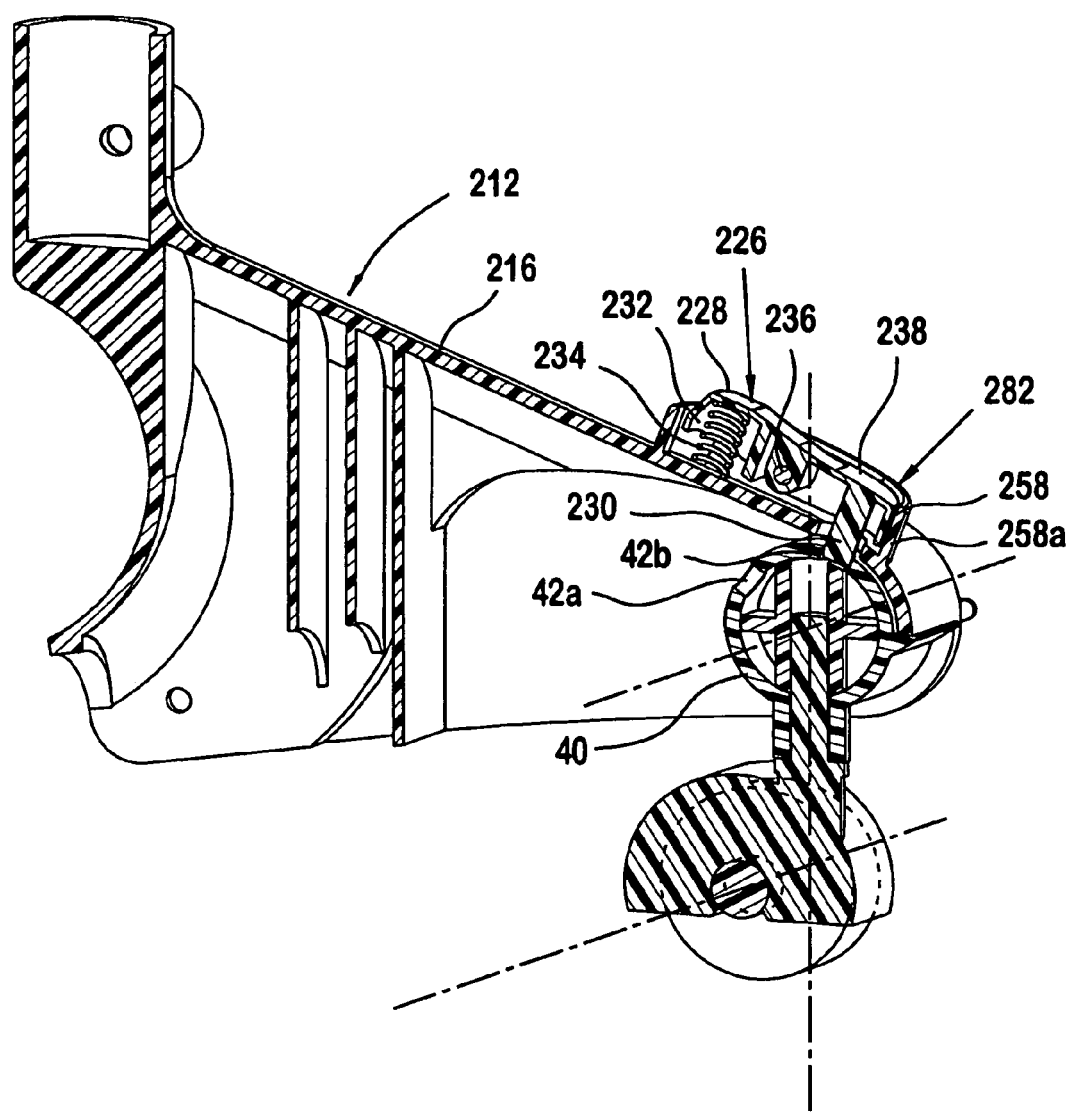
FIG. 7 is a cross-section in the direction of arrows 7—7 of FIG. 6.

In the alternative embodiment shown in FIGS. 6 and 7, a support assembly 212 includes a locking mechanism 282 which is comprised of a locking member 226 having first and second ends 228, 238. First end 228 includes a cavity 232 which receives one end of a spring 234. Preferably, an outer surface of the first end 228 includes ridges or a knurled portion to provide friction to facilitate actuation of the locking member 226. The spring 234 is shown as a coiled compression spring. Alternatively, other types of springs may be used including leaf springs and torsion springs. Locking member 226 is positioned in a recess 258 surrounded by a continuous wall 258a to protect member 226 from damage and inadvertent actuation. Member 226 rotates about a pivot 236, extending into opposing sides of wall 258a of the seat 258, within a range limited by engagement between opposite ends of member 226 and the surface of the housing 216.

A projection 230, preferably integral with the second end 238, selectively engages one of the locking openings 42a, 42b provided in cylindrical member 40 to prevent rotation of the cylindrical member 40. The spring 234 provides a biasing force which urges the locking member 226 in a direction to cause projection 230 to engage the outer surface of cylindrical member 40. When the projection is aligned with one of the openings 42a, 42b, it enters that opening to lock the cylinder against further rotation, functioning in the same manner as the preferred embodiment of FIGS. 1–3.

Figure 8:
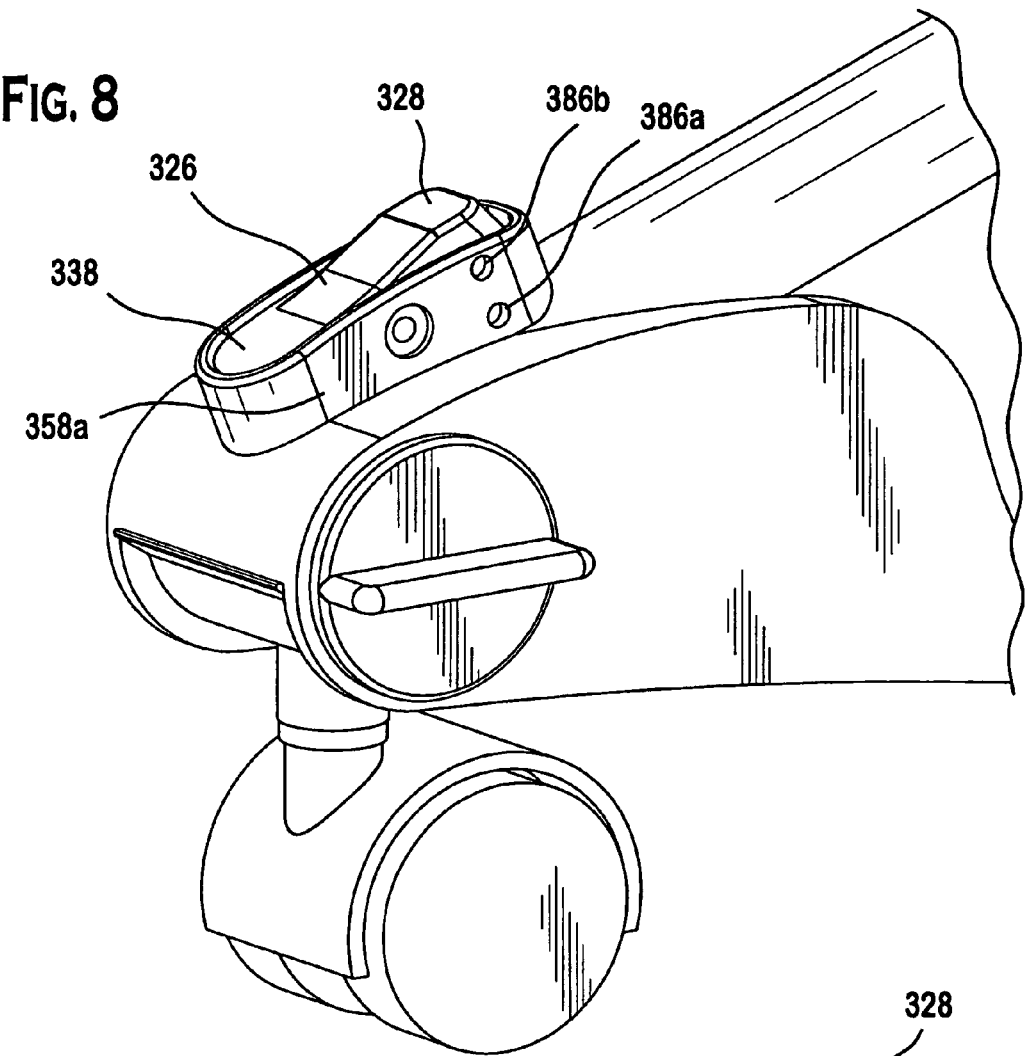
FIG. 8 is an isometric view of another alternative embodiment of the support assembly.
Figure 8A:
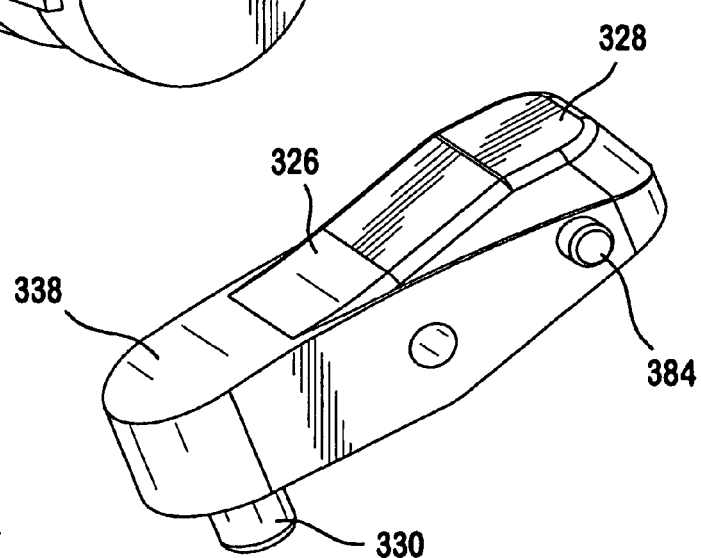
FIG. 8a is an isometric view of a locking member of the embodiment of FIG. 8.

Another alternative embodiment, similar to the embodiment of FIG. 6, is shown in FIGS. 8 and 8a. In this embodiment, the spring 224 is omitted and a locking member 326 and projection 330 are locked in position by detent 384 which selectively engages one of detent apertures 386a, 386b. If desired, the detent may be provided on the inside of the continuous wall 358a and the detent openings provided on a side of the member 326 adjacent to the detent.

Again referring to the preferred embodiment of FIGS. 1–3, the cylindrical member 40 is rotatably attached to the housing 16 and further includes a hollow integral protrusion 44 for receiving the shaft 50 in its hollow interior. By lifting the knob 28, locking projection 30 is disengaged from the cylindrical member 40, allowing free rotation of the cylindrical member 40. The cylindrical member 40 also includes a stop 54, which engages a lip 56 of the housing 16, for limiting the range of rotation of the cylindrical member 40 in the counter-clockwise direction relative to FIG. 3.

A control member 48 is inserted into the hollow interior of cylindrical member 40 and is secured to the cylindrical member by shaft 50, of the wheel assembly 52, which pivotably supports the wheel assembly 52. Shaft 50 extends through hollow opening 46 of protrusion 44 and an opening 48a in the control member 48. The control member 48 engages the marginal perimeters of apertures 80 on opposite sides of the housing 16, which serve as bearings for member 48. A boss 90 provides an additional bearing surface to support the control member 48. Also, the control member 48 is preferably sized to form a press fit with the cylindrical member 40. Alternatively, the shaft 50 may be omitted, and the wheel assembly may be integrally molded with the cylindrical member 40 or rigidly attached to the cylindrical member 40 by an adhesive or a plurality of fastening members.

A finger grip 60, integral with the control member 48, facilitates rotation of the wheel assembly. The grip 60 is preferably molded integrally with the control member 48, but may be joined by other means. To assemble the device, the cylindrical member 40 is placed in the hollow interior of housing 16 and aligned with the openings 80. The control member 48 is inserted through one of the apertures 80 in the housing 16 and through the cylindrical member 40 and the end opposite the grip 60 is pushed into the boss 90. The perimeter of grip 60 preferably engages an adjacent surface of the housing 16. Support shaft 50 of wheel assembly 52 is inserted into protrusion 44 and opening 48a which are initially brought into alignment. Shaft 50 retains the assembly in place.

Alternatively, the grip 60 may be rigidly attached to the cylindrical member 40 or omitted entirely; in such cases the control member 48 may be omitted as well. If the control member 48 is omitted, the cylindrical member 40 must be configured to pivot within apertures 80.

With reference to FIG. 3, the wheel assembly 52, connected to both the control member 48 and the cylindrical member 40, rotates about a first axis 84 which is also the axis of rotation of cylindrical member 40, and also about a second axis 86 defined by the shaft 50. The wheel assembly 52 includes a rotatable wheel 62 and preferably includes a wheel stop having a locking lever 64 for preventing rotation of the wheel 62 about a third axis 66.

The locking projection 30 engages the locking opening 42a to prevent rotation of the cylindrical member allowing the wheel assembly 52 to be retained in the retracted position within recess 68 in the housing 16. When each wheel assembly is so positioned, the support 10 is permitted to rest on the base support members 20. The locking projection 30 engages the locking opening 42b to permit the wheel assemblies 52 to be extended downwardly outside of the housing 16 allowing the support frame 10 to rest on the wheel assemblies 52.

Figure 4:
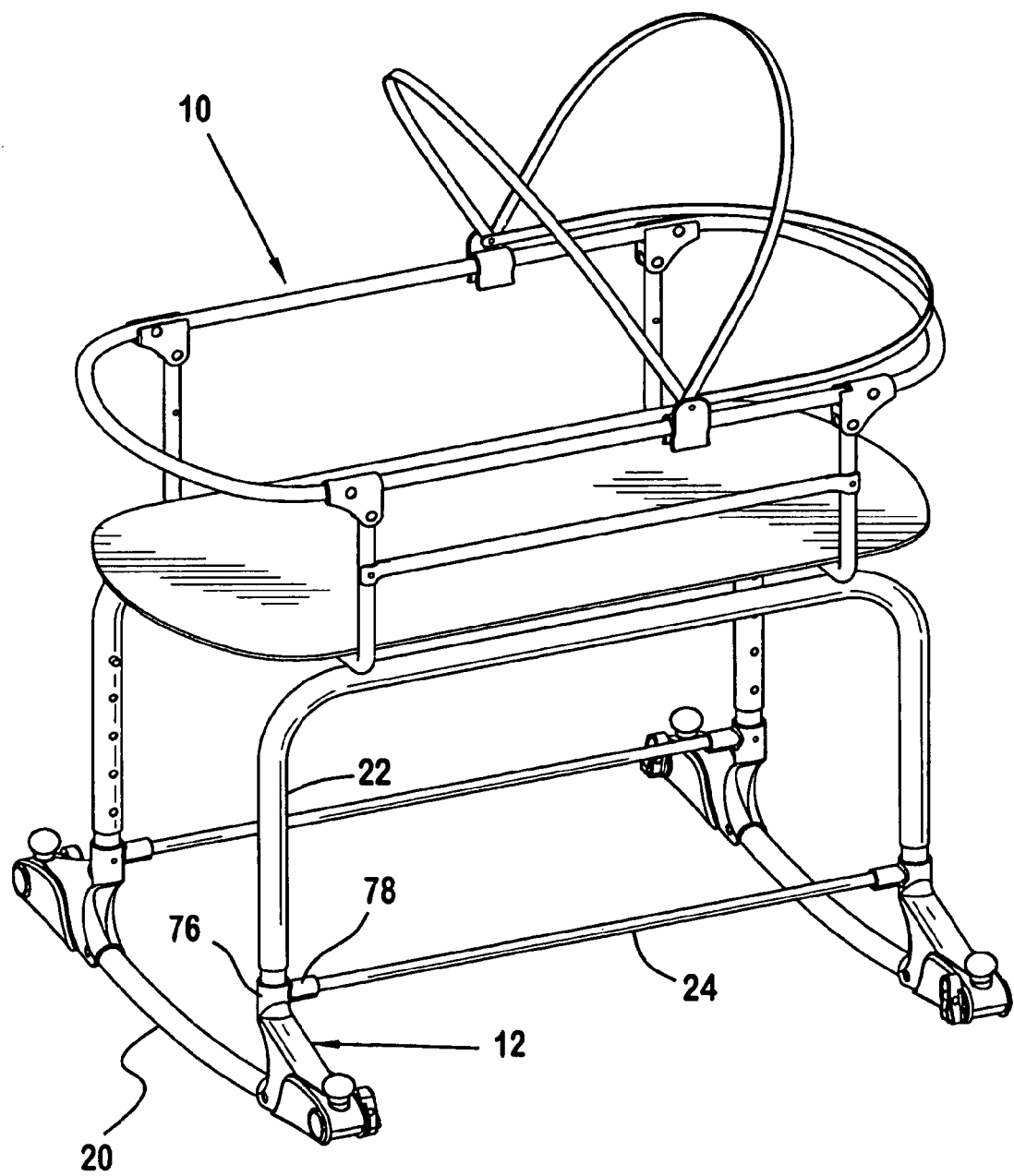
FIG. 4 is an isometric view of the support frame of FIG. 1 with the wheel assemblies retracted.
Figure 5:
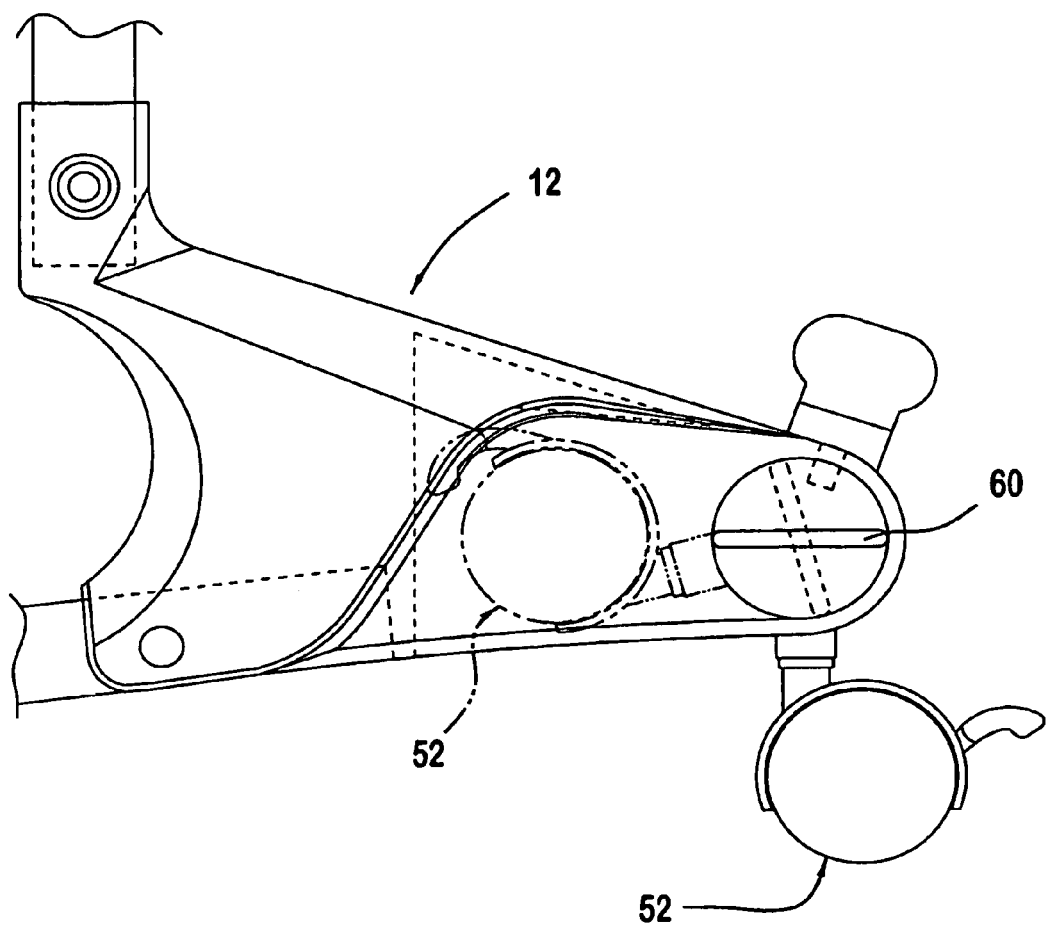
FIG. 5 is a profile view illustrating a support assembly of FIG. 1 in, both the extended and retracted positions.

The operation of the mechanism 82 follows:

Making reference to FIGS. 3, 4, and 5, the wheels are retractable into the housing 16. Knob 28 of locking member 26 is pulled to withdraw the locking projection 30 from the locking opening 42a. When the projection 30 is free of opening 42a, grip 60 is rotated to rotate the wheel assembly to the extended position. Locking member 26 may be released after rotation of the grip 60 has begun. Projection 30 will snap into locking opening 42b, under the force of the spring 34 when wheel assembly 52 is in the extended position shown in FIGS. 1, 2, and 3. The rotation of the wheel assembly 52 about the axis 84 away from the recess 68 is arrested by the stop 54, which engages lip 56 of the housing 16. Stop 54 also assures alignment of projection 30 with locking opening 42b.

Making reference to FIGS. 1, 2, and 3, the support assembly 12 is shown with each wheel assembly 52 extended. Each wheel assembly 52 is retractable into a respective recess 68 in a manner similar to the manner in which it was withdrawn. Member 26 is pulled to withdraw projection 30 from locking opening 42b. Grip 60 is then rotated to rotate the wheel assembly to the retracted position. If desired, rather than operating grip 60, wheel assembly 52 may be pushed into the recess. The operating grip may be eliminated if desired.

Making reference to FIG. 3a, an alternative embodiment of the support assembly 112 eliminates need for a spring by providing a detent 184 and detent apertures 186a, 186b to lock a locking projection 130 into one of the locking openings 42a, 42b of the cylindrical member 40. By lifting the knob 128, the locking projection 130 is released from one of said locking openings 42a, 42b, and the detent 184 engages a first detent aperture 186a allowing rotation of the wheel assembly 52 about axis 84. By pressing the knob 128, the projection 130 enters into one of said locking openings 42a,42b and the detent 184 engages a second detent aperture 186b retaining the projection in one of said locking openings 42a,42b without a biasing spring. If desired, detents may be provided on any suitable location on the locking projection 130 with associated detent apertures provided on corresponding portions of the integral extension 58. Alternatively, detents may be provided on the inner wall of integral projection 58 with associated detent apertures formed as grooves on the locking projection 130.

Making reference to FIGS. 6 and 7, this alternative embodiment functions essentially the same as the embodiment of FIGS. 1–3, except that the end 228 of locking member 226 is pushed to withdraw the locking projection 230 from one of locking openings 42a, 42b. Similarly, the alternative embodiment, shown in FIGS. 8 and 8a functions essentially the same as the prior alternative embodiment of FIG. 3a. However, the end 328 is pushed to release the locking projection 330 from one of said locking openings 42a, 42b and to allow detent 384 to engage a first detent aperture 386a permitting rotation of the wheel assembly 52. By depressing a second end 338, the projection 330 enters into one of said locking openings 42a,42b and the detent 384 engages a second detent aperture 386b retaining the projection in one of said locking openings 42a,42b without a biasing spring.

What is claimed is:

1. A support frame comprising a plurality of wheeled assemblies and at least one support member, each of the wheeled assemblies mounted near corners of the support frame, and each of the wheeled assemblies including:
    a housing having a first end for receiving the at least one support member;
    a rotatable member, mounted in said housing for rotation about a first axis, and having at least first and second locking apertures;
    a wheel assembly, having a support shaft engaging the rotatable member and being movable with rotation of said rotatable member; and
    a locking member having a locking portion and being movably mounted on said housing between a first position in which said locking portion is engaged with said rotatable member and a second position displaced from said rotatable member,
    whereby the rotatable member is prevented from rotation when the locking portion extends into one of said locking apertures.

2. The support frame according to claim 1, wherein the plurality of wheeled assemblies consists of four wheeled assemblies, and one of each of the wheeled assemblies is positioned at one of each of four corners of the support frame.

3. The support frame according to claim 2, wherein each of the wheel assemblies further includes a control member, inserted into the rotatable member; and said control member having a control grip which extends beyond an adjacent exterior surface of the housing, said grip facilitating rotation of its associated wheel assembly.

4. The support frame according to claim 3, wherein each of the wheel assemblies further includes a shaft extending into the rotatable member and the control member, and wherein the wheel assembly is rotatable about said shaft about a second axis.

5. A wheeled assembly for supporting a transportable unit, the assembly comprising:
    a housing having a first end for attachment to a transportable unit and a second end for receiving a rotatable member;
    the rotatable member defining at least first and second locking apertures positioned at spaced apart locations about its outer surface and a receiving channel positioned apart from said apertures, and is mounted in said housing for rotation about a first axis;
    a wheel assembly, having a support shaft engaged in said receiving channel of said rotatable member; and
    a movable locking member that includes a locking portion, and is mounted on said housing for selective engagement with one of the first and second locking apertures to position the wheel assembly in a desired position when the rotatable member is rotated about the first axis.

6. The wheeled assembly according to claim 5, wherein the locking portion of the locking member includes a projection aligned substantially perpendicular to the first axis when inserted into one of the locking apertures.

7. The wheeled assembly according to claim 5, wherein the locking member further includes at least one detent, and wherein the housing includes at least two detent apertures which cooperate with the at least one detent to selectively lock the locking portion in said first and second locking apertures.

8. The wheeled assembly according to claim 5, wherein the rotatable member further includes a stop, which engages a lip provided on said housing to prevent the rotatable member from further rotation in a given direction.

9. The wheeled assembly according to claim 5, wherein said wheel assembly is retracted into a recess in said housing when the locking portion is inserted in said first locking aperture.

10. The wheeled assembly according to claim 9, wherein said wheel assembly is extended out of said recess when the locking portion is inserted in said second locking aperture.

11. The wheeled assembly according to claim 5, wherein the locking member further includes a knob which carries said locking portion and a flange connected to the locking portion, and wherein the wheeled assembly further comprises a spring positioned between said flange and said housing to provide a force to urge the locking portion toward said rotatable member.

12. The wheeled assembly according to claim 11, wherein the housing further includes a hollow integral extension having a rim, located on an exterior surface of the housing, which receives the locking member, wherein the spring is contained between the rim and the flange.

13. The wheeled assembly according to claim 5, wherein the locking member further includes a first end which carries said locking portion, a second end which has a cavity, said locking member being pivoted about a pivot axis located between the first and second ends, a spring positioned between said cavity and said housing to provide a force to urge the locking portion toward said rotatable member.

14. The wheeled assembly according to claim 13, further comprising a seat, located on an exterior surface of the housing, which houses and pivotably supports the locking member.

15. The wheeled assembly according to claim 13, wherein the rotatable member rotates independently from the locking member.

16. The wheeled assembly according to claim 5, further comprising a control member, inserted into the rotatable member; and said control member having a control grip which extends beyond an adjacent exterior surface of the housing, said grip facilitating rotation of the wheel assembly.

17. The wheeled assembly according to claim 16, wherein the locking member is mounted along a first exterior surface of the housing.

18. The wheeled assembly according to claim 17, wherein said adjacent exterior surface is substantially perpendicular to the first exterior surface.

19. The wheeled assembly according to claim 16, wherein the wheel assembly includes a shaft extending into the rotatable member and the control member.

20. The wheeled assembly according to claim 19, wherein the rotatable member further includes a hollow protrusion for receiving said shaft.

21. The wheeled assembly according to claim 19, wherein the wheel assembly is rotatable.

22. The wheeled assembly according to claim 21, wherein the wheel assembly further includes a wheel stop to prevent rotation of a wheel of the wheel assembly.

* * * * *